(No Model.)
J. F. MYERS.
COOKING, HEATING, AND ILLUMINATING LAMP STOVE.
No. 481,768. Patented Aug. 30, 1892.
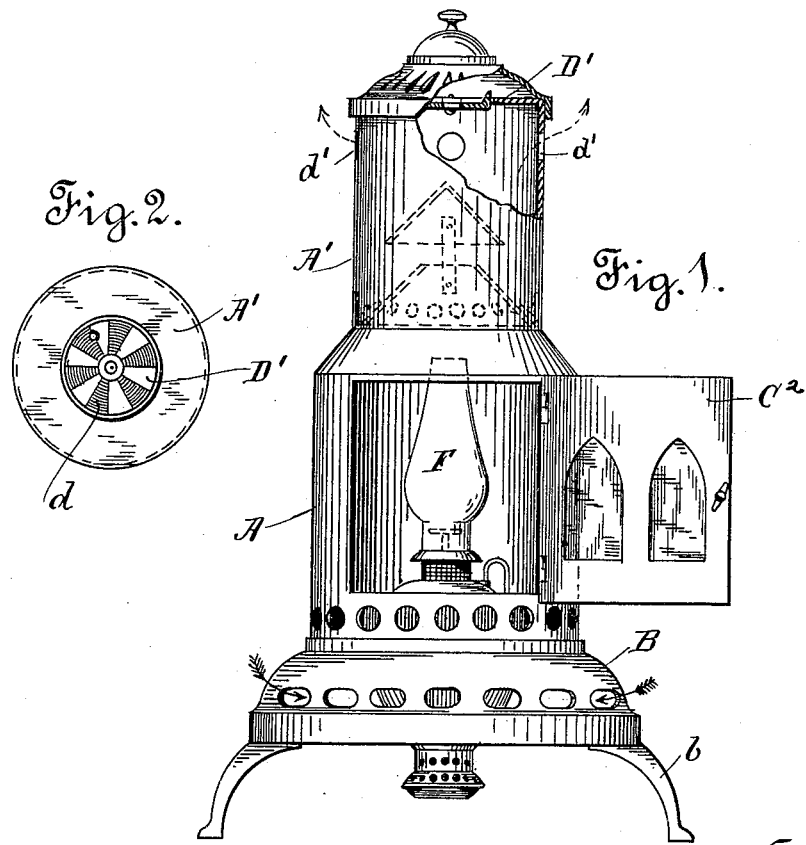
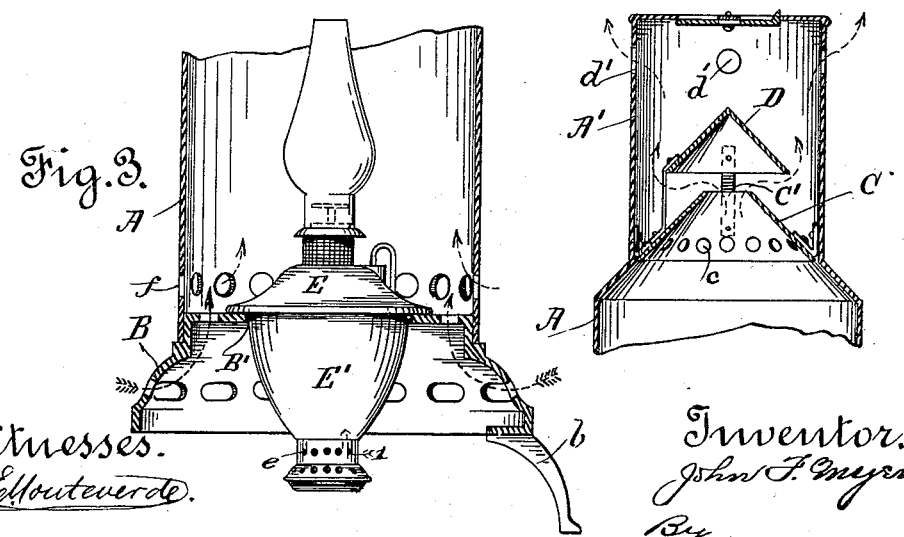
Witnesses.
Inventor.
John F. Myers

UNITED STATES PATENT OFFICE.

JOHN F. MYERS, OF SAN FRANCISCO, CALIFORNIA.

COOKING, HEATING, AND ILLUMINATING LAMP-STOVE.

SPECIFICATION forming part of Letters Patent No. 481,768, dated August 30, 1892.

Application filed February 17, 1892. Serial No. 421,823. (No model.)

*To all whom it may concern:*

Be it known that I, JOHN F. MYERS, a citizen of the United States, residing at San Francisco, in the county of San Francisco and State of California, have invented certain new and useful Improvements in Cooking, Heating, and Illuminating Lamp-Stoves; and I do hereby declare the following to be a full, clear, and exact description of said invention, such as will enable others skilled in the art to which it most nearly appertains to make, use, and practice the same.

My invention has relation to certain new and useful improvements in illuminating, cooking, and heating lamp-stoves adapted for sick-rooms or other purpores, which consists in the arrangement of parts or details of construction, as will be hereinafter more fully set forth in the drawings, described, and pointed out in the specification.

My invention has for its object to so construct a lamp-stove as to permit of its being adapted for heating purposes solely or as a heating and cooking stove, and, further, as a combined heating, illuminating, and cooking-stove, thus providing a lamp-stove adapted more especially for use in connection with sick-rooms, inasmuch as in such cases it is necessary to obtain all requisite heat with as little light as possible in order not to disturb the invalid, except at such times as is required to prepare medicines, &c., when the stove may readily be used for illuminating purposes.

Referring to the drawings forming a part of this application, wherein similar letters of reference are used to denote corresponding parts, Figure 1 is a front elevation showing stove entire with door open; Fig. 2, a top plan view; Fig. 3, a cross-sectional view of Fig. 1, partly broken away; and Fig. 4, a vertical sectional view of heating-dome.

The letter A is used to indicate the casing of lamp-stove, which is secured to base B, mounted upon legs $b$, in order to raise same from floor in order to allow air to circulate thereunder. Casing A is provided with swinging door $C^2$, which allows of the inclosed casing being opened or closed in order to admit or shut out light within the room. When said door is opened, as shown in Fig. 1, the stove is then used to illuminate, while when closed the rays of light are shut out. To the top of casing A, as shown in Figs. 1 and 4, is secured heating and cooking drum A'.

Within the lower portion of the drum is secured plate C, which is provided with central opening C' and series of surrounding perforations $c$. This plate is of a cone shape and serves to impart greater draft to the stove.

To and above the cone-shaped plate is secured or attached protecting-cup D, which is designed to prevent water or the like dropping upon the lamp-chimney when the stove is used for cooking purposes, as will be hereinafter explained.

The top of drum A' is provided with damper D', which when opened causes the heat retained within the drum to pass directly through opening $d$. By the opening of the damper I am enabled to heat vessels placed on top of the drum for cooking or other purposes. By closing the damper the heat is retained longer within the drum and makes its escape through perforations $d'$, formed in the upper end thereof.

The base or stand B is provided with central openings B', within which lamp E fits, Fig. 3, the oil receptacle or tank E' extending below the same. The upper portion or burner of said lamps extends within the inclosing casing, as shown in Figs. 1 and 2. It will thus be observed that the lamp is suspended by the base within an inclosed casing. The glass chimney F of the lamp extends nearly to plate C of the drum. Consequently the heat passing therethrough is discharged thereagainst, and passing through central opening thereof is discharged into drum A'.

Inasmuch as the lamp employed in my stove is a central-draft one the oil-reservoir thereof must be suspended below the raised base of the stove in order to obtain necessary supply of air thereto, which enters as shown by arrows 1, Fig. 3. In order to insure the necessary supply of air, the base is provided with a series of perforations $e$.

Inasmuch as the inclosing casing is constructed to open or close it is obvious that no other style of lamps could be employed in connection with my stove, inasmuch as if so the opening of door $C^2$ would cause the lamp to smoke. Again, the heated air contained within the casing and drum would cause the undue heating of the oil contained within receptacle of an ordinary lamp when confined within an inclosed casing. Fresh air is also admitted to the inclosed casing through openings $f$, formed in lower portion thereof. It will thus be seen that it is essential that a central-draft lamp be employed in connection with my stove, and that same may properly draw it is imperative that the base B be so constructed as to permit of lamp being suspended therein and air supplied beneath same. By entirely inclosing the lamp within the casing I am enabled to secure greater heat to the air retained therein.

When desired to use the stove for heating and illuminating, it is only necessary to open door $C^2$ and light of inclosed lamp will be reflected into the room. The air passing through central-draft lamp is heated and discharged into drum, from whence it passes into the room.

By providing the heating-drum with protecting-cup D, which is suspended therein, and plate C, I overcome liability of lamp-chimney becoming broken or cracked when stove is used for cooking purposes by reason of water contained in cooking-vessel passing through damper-openings $d$ and falling thereon. In my stove should water pass through openings $d$ the same will fall upon protecting-cup D, and from thence run upon cone plate C and run therefrom beyond line of chimney-lamp.

Having thus fully described my invention, what I claim as new, and desire to secure protection in by Letters Patent of the United States, is—

1. The combination of the base having a central perforation and a series of air-openings, an inclosing casing secured upon said base and provided with a series of air-openings in its lower end, and the central-draft lamp suspended in the central perforation of the base and having its oil-reservoir depending below the same and its burner extending upward within the inclosing casing.

2. The combination of the base, the lamp supported thereby, the casing erected on the base, the deflecting-plate secured to the upper end of the casing and provided with a series of perforations, the drum rising from the said plate and inclosing the perforations therein and provided with a series of air-openings near its upper end, the damper in the top of the drum, and a deflecting-cup secured within the drum and extending over the central opening of the deflecting-plate.

In testimony whereof I affix my signature in presence of two witnesses.

JOHN F. MYERS.

Witnesses:
   N. A. ACKER,
   L. W. SEELY.